United States Patent [19]

Fletcher

[11] Patent Number: 4,481,242
[45] Date of Patent: Nov. 6, 1984

[54] AQUATIC WEED BARRIER

[75] Inventor: Eldon L. Fletcher, Kingston, Canada

[73] Assignee: Du Pont Canada, Inc., Montreal, Canada

[21] Appl. No.: 402,859

[22] Filed: Jul. 29, 1982

[51] Int. Cl.³ .............................................. B32B 3/24
[52] U.S. Cl. ..................................... 428/136; 428/134; 428/135; 428/132; 428/919; 47/28 R; 405/258
[58] Field of Search ....................... 428/134, 136, 919; 405/258; 47/31, 28 R, 29

[56] References Cited

U.S. PATENT DOCUMENTS 3,069,796 12/1962 Ruter .............................. 428/919 X
4,056,936 11/1977 Mayer .............................. 47/31 X
4,323,605 4/1982 Rush ................................ 428/134

Primary Examiner—Alexander S. Thomas

[57] ABSTRACT

An aquatic weed barrier is disclosed which comprises a film having a plurality of incisions therein. Each incision is shaped to form at least one flap adjacent the incision. The film has a light transmittance of less than 50% in the 200 to 650 nm wavelength range.

4 Claims, 11 Drawing Figures

AQUATIC WEED BARRIER

BACKGROUND

The present invention relates to a thermoplastic polymeric sheet material used for preventing growth of aquatic weeds.

The presence of some aquatic weeds in waterways can become problematic. For example, the introduction of Eurasian millfoil in Canadian lakes and canals has resulted in clogging of certain sections of these lakes and canals. Uncontrolled aquatic weed growth may also lead to impediment of flow of water through irrigation ditches. Further, in sub-tropical and tropical climates aquatic weeds tend to harbour and provide a food source for water snails. Such water snails can be carriers for parasites and diseases e.g. shistosomiasis which are transmissible to human beings and other animals. It may be seen therefore that methods of controlling or eradicating aquatic weeds in waterways is often desirable.

Herbicides are not often used because of dilution in the water to which they are added. Harvesting e.g. semi-annually tends to be expensive and requires land-based areas set aside for decomposition of the harvested weeds.

It is also known to apply directly over rooted aquatic plants a foraminous screen e.g. closely woven glass fibre screening to control weed growth at the bottom of bodies of water. Such a screen is disclosed in U.S. Pat. No. 4,056,936 to J. R. Mayer issued Nov. 4, 1977. Such foraminous screen material permits some growth of aquatic weeds, but because of the relatively small size of the holes in the screen the thickness of roots or stems which pass therethrough are controlled, thus stunting the growth of such weeds. Stunting of growth of weeds on the bottom of the water body is also aided by the effect of the screening to partially block sunlight from reaching the bottom of the water body. Closely woven screening is not entirely satisfactory, however, because it permits some growth of the weeds. For plants such as Eurasian millfoil which may propagate by suckers, cuttings or seedlings, any control method which permits growth is less desirable than methods which do not permit growth.

Another material for controlling weed growth has now been found.

Accordingly the present invention provides a film, of a thermoplastic synthetic polymer, having a plurality of incisions therein, each incision being shaped to form at least one flap of film adjacent the incision, such film also having a light transmittance in the 200 to 650 nm wavelength range of less than 50%.

In a preferred embodiment each incision is shaped such that the flaps adjacent each incision have an area of between about 1 and about 25 cm$^2$.

In another embodiment there are between about 36 incisions and 1 incision per square meter of film.

In a further embodiment each incision is in the form of a vee, forming a triangular flap, the area of each such flap being between about 1 and about 25 cm$^2$.

In yet another embodiment the thermoplastic synthetic polymer is selected from the group consisting of nylon, homopolymers and copolymers of $C_2$-$C_3$ olefins, polyesters and polyvinylchloride.

Nylon films e.g. cast i.e. unoriented nylon 6 and nylon 66 films are preferred because they have densities higher than the density of fresh water and because water has a plasticizing effect on nylon which permits the nylon film to substantially conform to small irregularities on the bed of a waterway. Synthetic thermoplastic polymers which are less dense than fresh water may be used for the film of the present invention, but provision must be made to cause the film to remain on the bed of the water body.

In rocky areas reinforced films may be desirable e.g. a fabric of loosely woven polyethylene tapes, coated with polyethylene having the incisions therein.

In a further embodiment the thermoplastic synthetic polymer contains sufficient opacifying material to impart a light transmittance to the film of less than 50% in the 200 to 650 nanometer wavelength range as measured using a Cary* spectrophotometer with an integrating sphere attachment.

*denotes trade mark

In another embodiment the opacifying material, is selected from the group consisting of iron oxide, aluminum, titanium dioxide, calcium carbonate, talc, wollastonite, mica, lead oxide, zinc oxide, chromium oxide, calcium metasilicate, silicon dioxide and carbon black. In a preferred embodiment carbon black is added in the amount of between about 0.2 and about 2.0% by weight of the polymer.

In another embodiment the film has a thickness between about 25 and 250 μm.

In yet another embodiment the thermoplastic synthetic polymer contains sufficient opacifying material to reduce the light transmittance to less than 10% in the 200 to 650 nm wavelength range, and preferably less than 5% in the 200 to 650 nm wavelength range.

The present invention may be illustrated by reference to the drawings.

The incisions in the film serve to provide means for gases, which may collect under the film from decomposition of organic matter, to escape from under the film. It is believed that incisions which form flaps in the film are more effective than incisions which just provides a perforation in the film. The flaps act as a valve, permitting gas to escape from under the film, while providing a light screen when closed.

Figure 1:
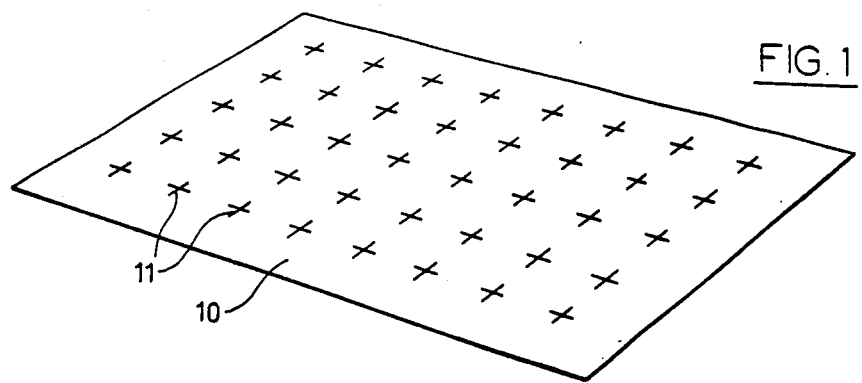
FIG. 1 shows one embodiment of the invention.

FIG. 1 shows a film 10 of thermoplastic synthetic polymer with a plurality of cross-shaped incisions, 11, therein.

Figure 2:
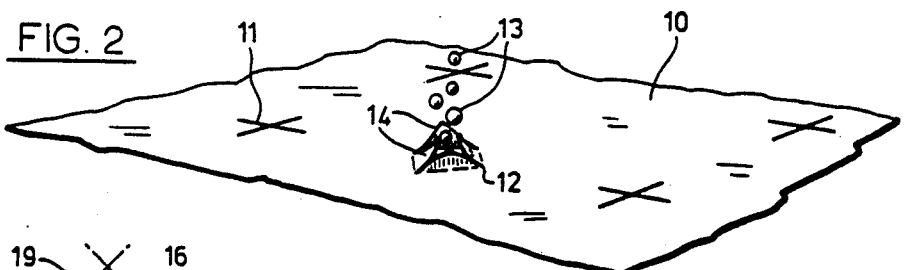
FIG. 2 shows a portion of the film of FIG. 1 in use.

FIG. 2 shows a portion of the film of FIG. 1 on the bed of a waterway. Incision 12 is shown permitting decomposition gases 13 to escape by lifting flaps 14.

Figure 3:
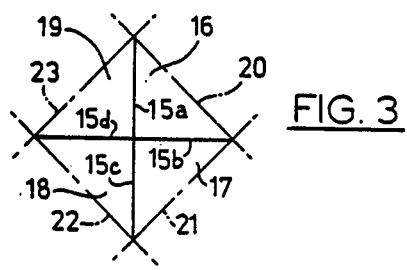
FIGS. 3–9 show various configurations for the incisions in the film.
Figure 4:
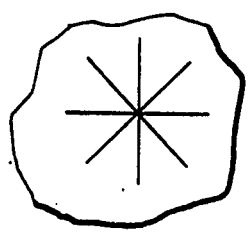

FIG. 3 shows a cross-shaped incision having arms 15a, 15b, 15c and 15d. Flaps 16, 17, 18 and 19 are formed between arms 15a and 15b, 15b and 15c, 15c and 15d, and 15d and 15a respectively. The flaps hinge about axes 20, 21, 22, and 23 respectively.

Figure 5:
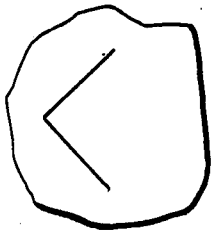
Figure 6:
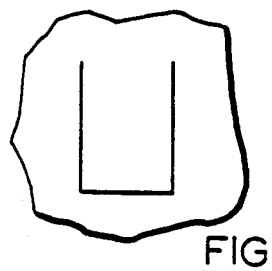
Figure 7:
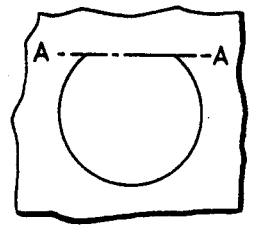
Figure 8:
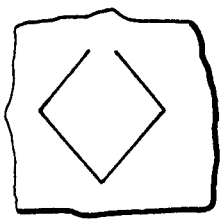
Figure 9:
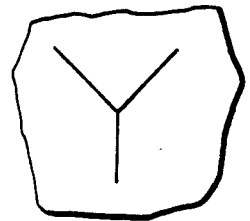

FIGS. 4 to 9 show a variety of other shapes of incisions which form flaps immediately adjacent the incisions. The vee-shape of FIG. 5 is preferred. In FIG. 7 it may be seen that the flap 24 may hinge about line A—A. The incisions may be made using die cutters.

Figure 10:
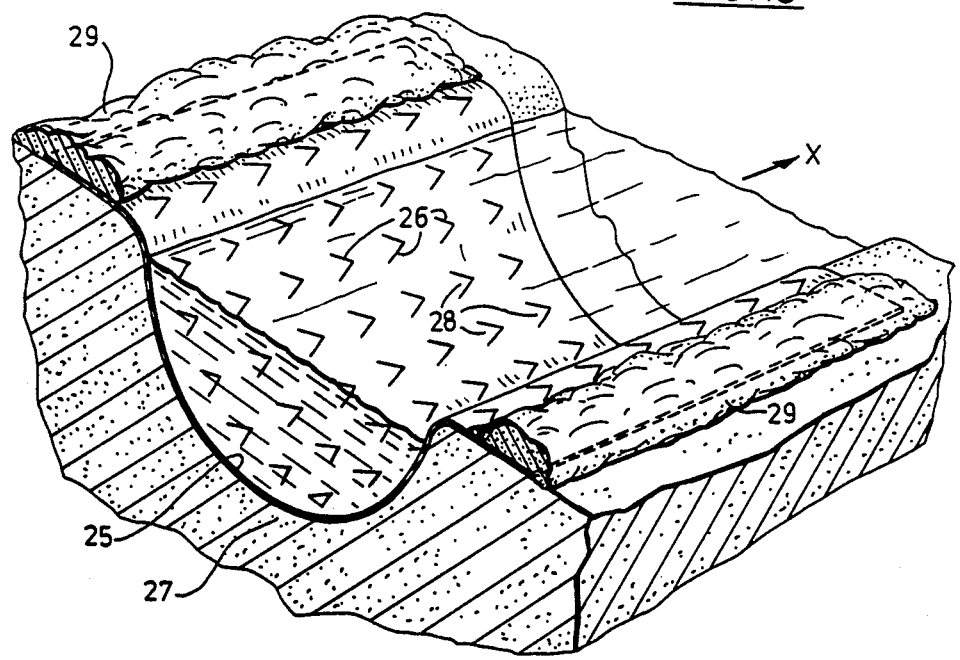
FIG. 10 shows a perspective representation of a portion of an embodiment of the invention on the bed of an irrigation ditch containing flowing water.

FIG. 10 shows a film of the present invention 25, having a plurality of vee-shaped incisions 26 therein, laid on the bed of an irrigation channel 27. The film is laid so that the apices of the vee-shaped incisions point in the direction of flow of the water shown by the arrow marked X. This allows the flaps 28 bounded by the incisions to remain closed under the influence of the travelling water. However, the flap does allow gases of decomposition to lift the flap and escape into the water stream. In the embodiment shown, the film 25 is wider than the irrigation channel and film 25 may therefore be held in place by mounds of earth 29, on top of the edges of the film at the banks of the irrigation channel.

It has been found that the distance between incisions may be as great as about 1 meter or more, but is preferably between about 25 and about 50 centimeters. The total area of the flaps, bounded by the hinge lines, adjacent each incision is between about 1 and about 25 cm$^2$, but is preferably between about 1 and about 12 cm$^2$, and more preferably between 1 and 4.5 cm$^2$.

It is preferred that the film have sufficient opacifying material therein, to retard growth of organisms beneath the film.

The film is preferably heavier than water so that it readily sinks. This may be accomplished through incorporation of dense fillers e.g. iron oxide, calcium carbonate in the film.

Figure 11:
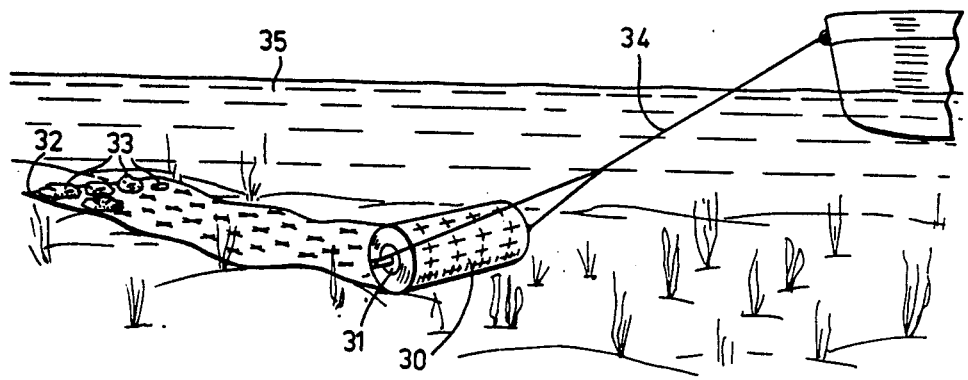
FIG. 11 shows a representation of a method of laying a film of the invention on the bed of a waterbody.

The film may be applied to the bed of a water body by means of the following procedure, which is illustrated in FIG. 11:

A roll of the material 30, having a rotatable core 31, is taken and one end of the film 32 is pulled from the roll. This end of the film is then dropped to the bottom of the water and held in position on the water bed 35 with heavy objects e.g. rocks 33. The roll of film is then pulled across the bed of the water body by ropes 34 attached to the ends of the rotatable core 31, so that the film unrolls, thus covering a strip of the bed of the water body as wide as the roll of film. If desired the film may be weighted at intervals using e.g. rocks. Several strips may be laid side by side in order to cover a large area.

The present invention may be illustrated by the following examples:

EXAMPLE 1

Cast nylon 66 film, having a width of 223 cm and a thickness of 50 μm was prepared by procedures known in the art. The film was dyed with Nylon Black KGH* black dye available from Ciba-Geigy so that the film had a light transmittance in the visible range of about 0.5%. This film was perforated with cross-like incisions, as shown in FIG. 1**, using a sharp knife. Each incision consisted of two cuts, in cross form, each cut being 3 cm long. The incisions were spaced apart 15 cm in the longitudinal direction of the film and 15 cm in the transverse direction of the film. A strip of this film 8.5 meters long was placed on a sloping bed of a lake, between about 0.75 and 5.5 meters below the surface. Prior to laying the film on the lake bed, the aquatic weeds were about 0.5–1.0 m high. The film was removed after 14 months. It was noted that the weeds below the film had died. There was no evidence that the film had been moved by action of decomposing gases. There was an occasional weed growing through an incision e.g. about 5 weeds/10 m$^2$. The film appeared to be a satisfactory barrier for aquatic weeds.

*Denotes trade mark
**200 to 800 nm

EXAMPLE 2

A cast nylon 66 film, having a width of 223 cm and a thickness of 50 μm was prepared and dyed as in Example 1. The film was perforated with cross-like incisions as shown in FIG. 1. Each incision consisted of two cuts, in cross form, each cut being 4 cm long. The incisions were spaced apart 30 cm in the longitudinal direction and 30 cm in the transverse direction of the film. A strip of this film 17 meters long was placed on the bed of a slow-moving river in Ontario, Canada, parallel to the banks of the river, at a depth of about one meter. The film was held in place with rocks. The normal weed growth at this depth was sufficient to prevent use of this area for recreational swimming. The material was laid early in June. The weed growth beneath the film was completely eliminated. No weeds were found growing through the incisions. It is not known however whether weeds did grow through some incisions but were removed by the action of the swimmers. There was no indication of gas accumulation beneath the film showing that the incisions were sufficiently large and sufficiently spaced to allow venting of any gases.

I claim:

1. A film, of a thermoplastic synthetic polymer, having a plurality of vee-shaped incisions therein forming a triangular flap, the area of each such flap being between about 1 and 25 cm$^2$, there being between about 36 incisions and 1 incision per square meter of film, said film also having a light transmittance in the 200 to 650 nm wavelength range of less than 50%.

2. A film according to claim 1 wherein the thermoplastic synthetic polymer is selected from the group consisting of nylon, homopolymers and copolymers of $C_2$–$C_3$ olefins, polyesters and polyvinyl chloride.

3. A film according to claim 2 wherein the thermoplastic synthetic polymer is nylon.

4. A film according to claim 3 wherein the nylon is cast nylon 6 or cast nylon 66.

* * * * *